(12) United States Patent
Yamaguchi et al.

(10) Patent No.: US 7,021,703 B2
(45) Date of Patent: Apr. 4, 2006

(54) VEHICLE REAR BODY STRUCTURE

(75) Inventors: Toshiyuki Yamaguchi, Wako (JP); Kazutaka Otsu, Wako (JP)

(73) Assignee: Honda Motor Co., Ltd., Minato-ku (JP)

( * ) Notice: Subject to any disclaimer, the term of this patent is extended or adjusted under 35 U.S.C. 154(b) by 0 days.

(21) Appl. No.: 10/960,852

(22) Filed: Oct. 6, 2004

(65) Prior Publication Data

US 2005/0073174 A1    Apr. 7, 2005

(30) Foreign Application Priority Data

Oct. 7, 2003  (JP) .............................. 2003-348653
Oct. 7, 2003  (JP) .............................. 2003-348683

(51) Int. Cl.
*B60K 7/00*    (2006.01)

(52) U.S. Cl. ............................. 296/203.04; 296/203.02

(58) Field of Classification Search .......... 296/203.04, 296/203.01, 204, 181.4, 30
See application file for complete search history.

(56) References Cited

U.S. PATENT DOCUMENTS

| | | | | |
|---|---|---|---|---|
| 4,290,626 A | * | 9/1981 | Sullivan et al. | ....... 280/124.155 |
| 4,542,934 A | * | 9/1985 | Komatsu et al. | ....... 296/203.02 |
| 4,723,811 A | * | 2/1988 | Harasaki | ................ 296/203.02 |
| 5,244,248 A | * | 9/1993 | Bovellan | ................ 296/203.02 |
| 5,263,694 A | * | 11/1993 | Smith et al. | ........... 280/124.155 |
| 5,788,322 A | * | 8/1998 | Wolf et al. | ............. 296/203.04 |
| 5,810,426 A | * | 9/1998 | Bovellan | ................ 296/187.03 |
| 5,829,824 A | * | 11/1998 | Yamamuro et al. | ......... 296/204 |
| 6,209,205 B1 | * | 4/2001 | Rumpel et al. | .............. 296/198 |
| 6,648,401 B1 | * | 11/2003 | Behnke et al. | .......... 296/203.04 |

FOREIGN PATENT DOCUMENTS

| | | | |
|---|---|---|---|
| JP | 2000-016338 | | 1/2000 |
| JP | 2000016338 A | * | 1/2002 |
| JP | 2002029453 A | * | 1/2002 |
| JP | 2003137140 A | * | 5/2003 |
| JP | 2003312546 A | * | 11/2003 |

* cited by examiner

*Primary Examiner*—Kiran B. Patel
(74) *Attorney, Agent, or Firm*—Hamre, Schumann, Mueller & Larson, P.C.

(57) ABSTRACT

A rear body structure for a vehicle includes a gusset for reinforcing a body floor, each rear wheel house, and a damper support member disposed on the body floor adjacent to the wheel house. The gusset has a first portion connected to the wheel house, a second portion connected to the body floor, and a third portion connected to the damper support member and an upper end portion of a damper with the damper support member disposed between the third portion and the upper end portion of the damper. With this arrangement, a force applied from the damper to the damper support portion can be efficiently distributed through the gusset to the wheel house and the body floor.

10 Claims, 10 Drawing Sheets

VEHICLE REAR BODY STRUCTURE

FIELD OF THE INVENTION

The present invention relates to a vehicle rear body structure having a damper portion with improved rigidity and easiness of assembly.

BACKGROUND OF THE INVENTION

Figure 10:
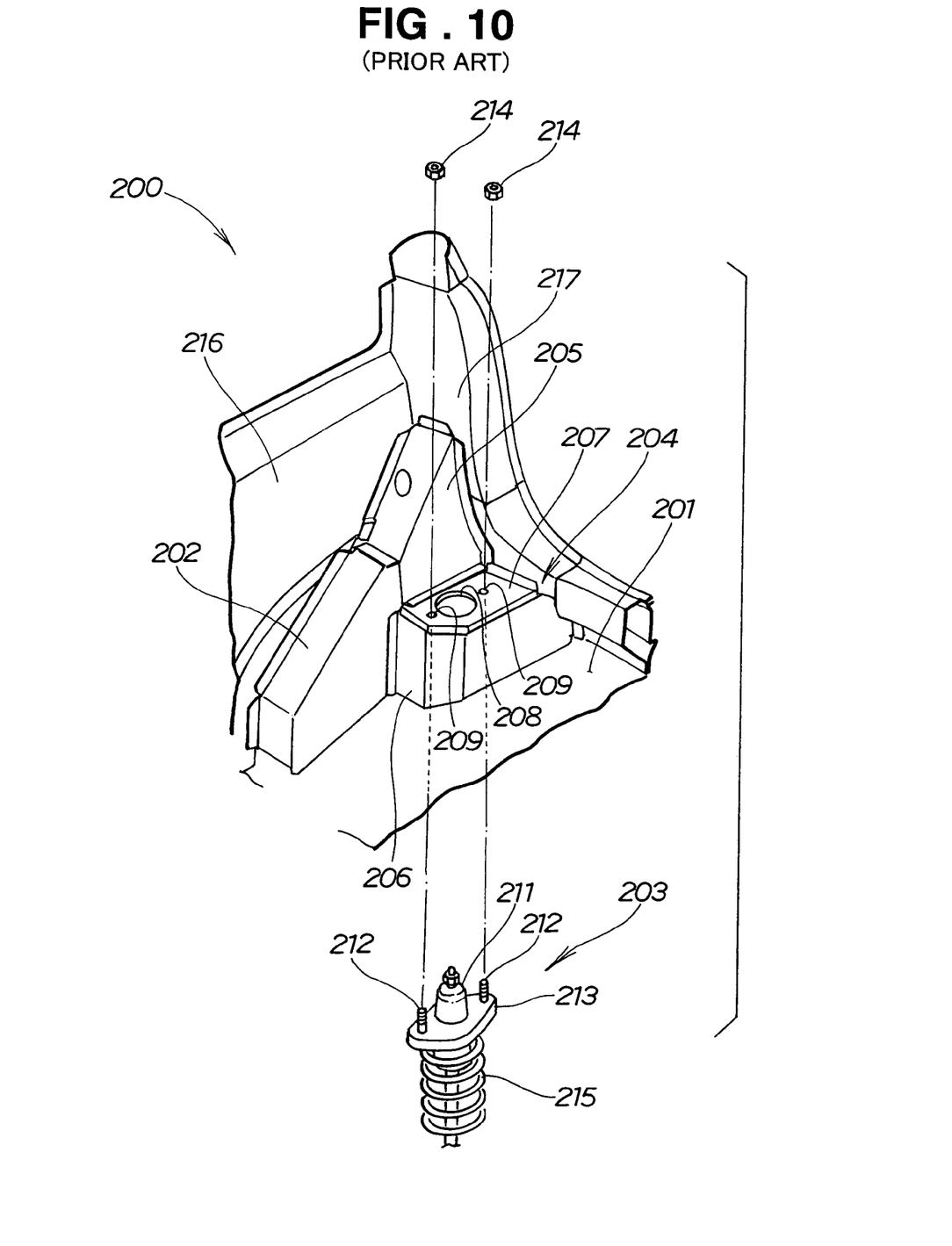
FIG. 10 is an exploded perspective view of a conventional vehicle rear body structure.

A typical example of conventional vehicle rear body structures is disclosed in Japanese Patent Laid-open Publication (JP-A) No. 2000-16338. The disclosed vehicle rear body structure, as shown in FIG. 10 hereof, includes a body floor 201, a wheel house 202 provided on the body floor 201 for covering an upper part of a rear wheel (not shown), a damper housing 204 disposed on the body floor 201 adjacent the wheel house 202 for supporting a damper 203, and a gusset 205 connecting a rear part of the wheel house to a side panel 216 and a rear panel 217 for reinforcing part of the rear body structure 200 in the vicinity of the wheel house 202 and the damper housing 204.

The damper housing 204 has a vertical sidewall 206 connected to the wheel house 202 and a horizontal upper wall as a damper base 207 connected to the gusset 205 and the rear panel 217. The damper base 207 has a through-hole 208 and a pair of bolt-insertion holes 209, 209 located near the through-hole 208 in diametrically opposite relation to each other. The damper 203 includes a mounting flange 213 and a coil spring 215 disposed below the mounting flange 213. The mounting flange 213 has a cylindrical protrusion 211 and a pair of bolts 212, 212 disposed near the protrusion 211 in diametrically opposite relation to each other. For assembly of the damper 203 relative to the vehicle body, the cylindrical portion 211 and the bolts 212 are inserted through the through-hole 208 and the bolt-insertion holes 209, respectively, from below until the mounting flange 213 is in abutment with an underside of the damper base 207, and while keeping this condition, a pair of nuts 214, 214 are screwed onto the bolts 212, 212 to firmly secure the mounting flange 213 to the damper base 207.

With the vehicle rear body structure 200 of the foregoing construction, since the gusset 205 serving as a reinforcing member is not connected to the body floor 201 and the damper 203 itself, the rear body structure 200 may be deformed at a portion adjacent the damper housing 204 due to a force applied from the damper 203 to the damper base 207 of the damper housing 204. To deal with this problem, an attempt may be made to increase the rigidity of the damper base 207 by increasing the thickness of the damper base 207, however, the thickened damper base 207 will undesirably increase the weight of the vehicle body.

Another problem associated with the conventional rear body structure 200 is that during the assembly of the damper 203 relative to the damper housing 204, the damper 203 must be supported from below so as to keep the mounting flange 213 in abutment with the underside of damper base 207 until the nuts 214 are tightly screwed onto the bolts 212. This operation makes the damper 203 relatively uneasy to assembly and lowers the assembling efficiency of the vehicle body.

SUMMARY OF THE INVENTION

It is, therefore, an objective of the present invention to provide a vehicle rear body structure having a damper portion, which is improved in rigidity and easy to assemble relative to the vehicle body.

According to the invention, there is provided a rear body structure for a vehicle, comprising left and right floor frames extending longitudinally of the vehicle, a body floor mounted to the left and right floor frames, left and right wheel houses mounted to the body floor for covering respective upper parts of left and right rear wheels of the vehicle, left and right damper support members disposed adjacent to the left and right wheel houses, respectively, left and right dampers each having an upper end portion supported by a respective one of the damper support members, and left and right gussets for reinforcing the body floor, the wheel houses and the damper support members. The gussets each have a first portion connected to a respective one of the wheel houses, a second portion connected to the body floor, and a third portion connected to a respective one of the damper support members and the upper end portion of a respective one of the dampers with the damper support member disposed between the third portion and the upper end portion of the damper.

By thus connecting the gussets to the wheel houses, the body floor, the damper support members and the dampers, forces applied from the dampers to the respective damper support members can be efficiently distributed through the gussets to the wheel houses and the body floor. As a result, the rigidity of a damper portion including the damper support members and neighboring parts (wheel houses and the body floor) thereof increases greatly.

In one preferred form of the invention, the upper end portion of each of the dampers has a mounting flange disposed below a respective one of the damper support members, a plurality of bolts projecting upward from the mounting flange, the bolts extending successively through the damper support member and the third portion of the gusset, and nuts screwed onto the respective bolts to firmly secure the third portion of the gusset and the mounting flange of the upper portion to the damper support member. With this arrangement, since the gusset is directly connected to the upper end portion of the damper with the damper support member disposed between the gusset and the damper upper end portion, the force applied from the damper to the damper support member is first born by the gusset and then to the wheel house and the body floor.

The rear body structure may further comprise a cross-member connected to and extending crosswise between the left and right floor frames. The cross-member also connects the left and right damper support members. By thus providing the cross member, the rigidity of the damper support members in a transversal direction of the vehicle is greatly improved. Preferably, the second portion of each of the gussets is also connected to the cross-member. This arrangement further increases the rigidity of a damper portion including the damper support members in the transversal direction of the vehicle. For the same purpose, the cross-member may be also connected to the body floor. Each of the wheel houses may include a reinforcing plate extending over and along an upper part of an inner member of the wheel house, and the first portion of each of the gusset is connected to the reinforcing plate.

Preferably, the upper end portion of each damper has a hook-shaped engagement portion, and the gussets each have a retaining portion releasably engageable with the hook-shaped engagement portion for temporarily retaining the upper end portion of each damper in a preassembled condition relative to a respective one of the damper support members. By thus retaining the upper end portion of the damper in the preassembled condition, it is possible for the operator to achieve the nut-tightening operation for connecting together the gusset, damper support member and the damper without supporting the damper from below. This operation increases the assembling efficiency of the damper relatively to the vehicle body. The retaining portion may be formed by a retaining lug projecting upward from an inner surface of each of the gussets, or an edge defining an opening formed in each gusset.

BRIEF DESCRIPTION OF THE DRAWINGS

A preferred structural embodiment of the present invention will be described in detail herein below, by way of example only, with the reference to the accompanying drawings, in which.

DETAILED DESCRIPTION OF THE PREFERRED EMBODIMENT

Figure 1:
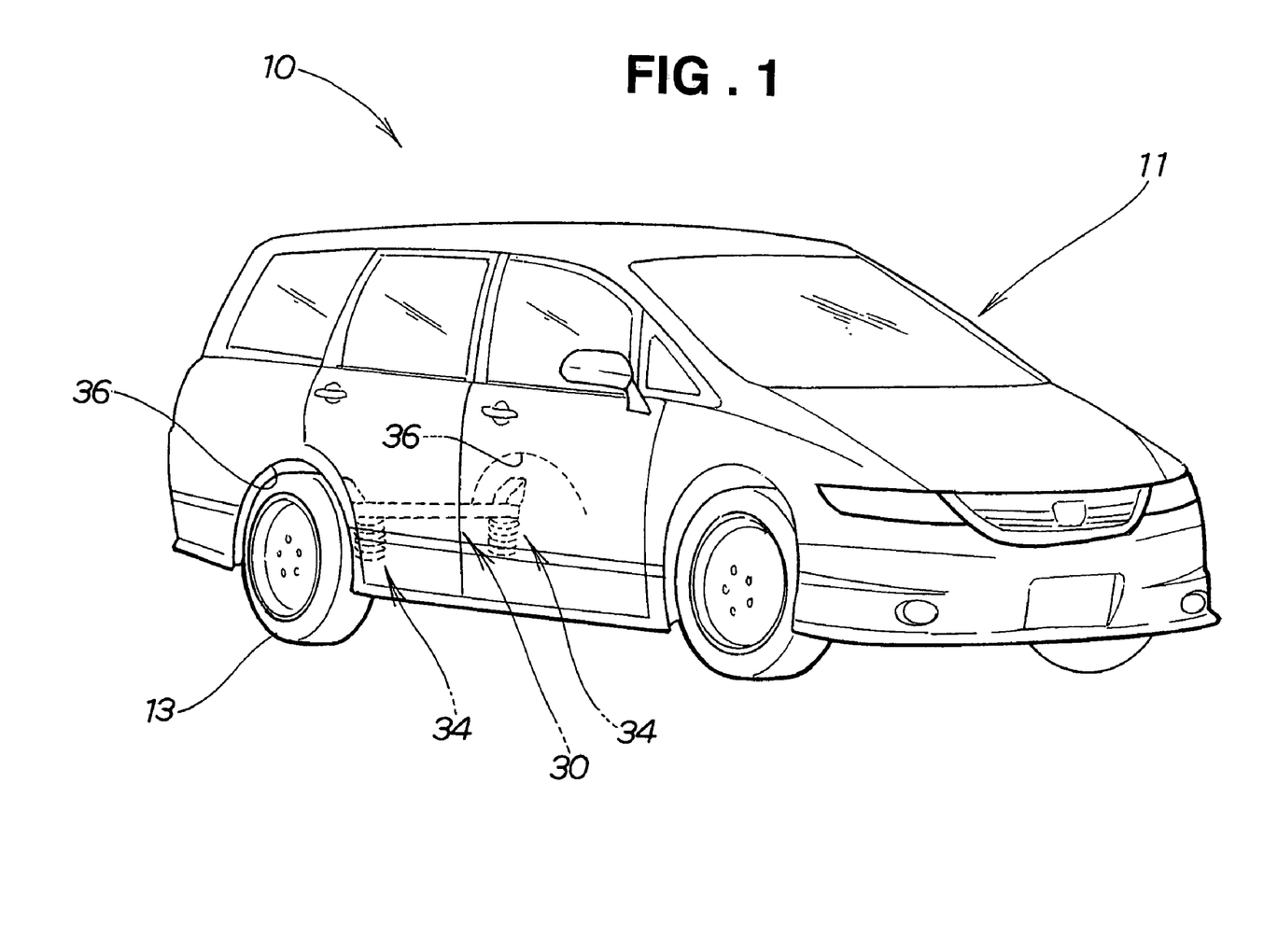
FIG. 1 is a perspective view of a vehicle including a vehicle rear body structure according to an embodiment of the present invention.

Referring now to the drawings and FIG. 1 in particular, there is shown in perspective a vehicle 10 having a body 11 including a rear body structure 30 according to an embodiment of the present invention.

Figure 2:
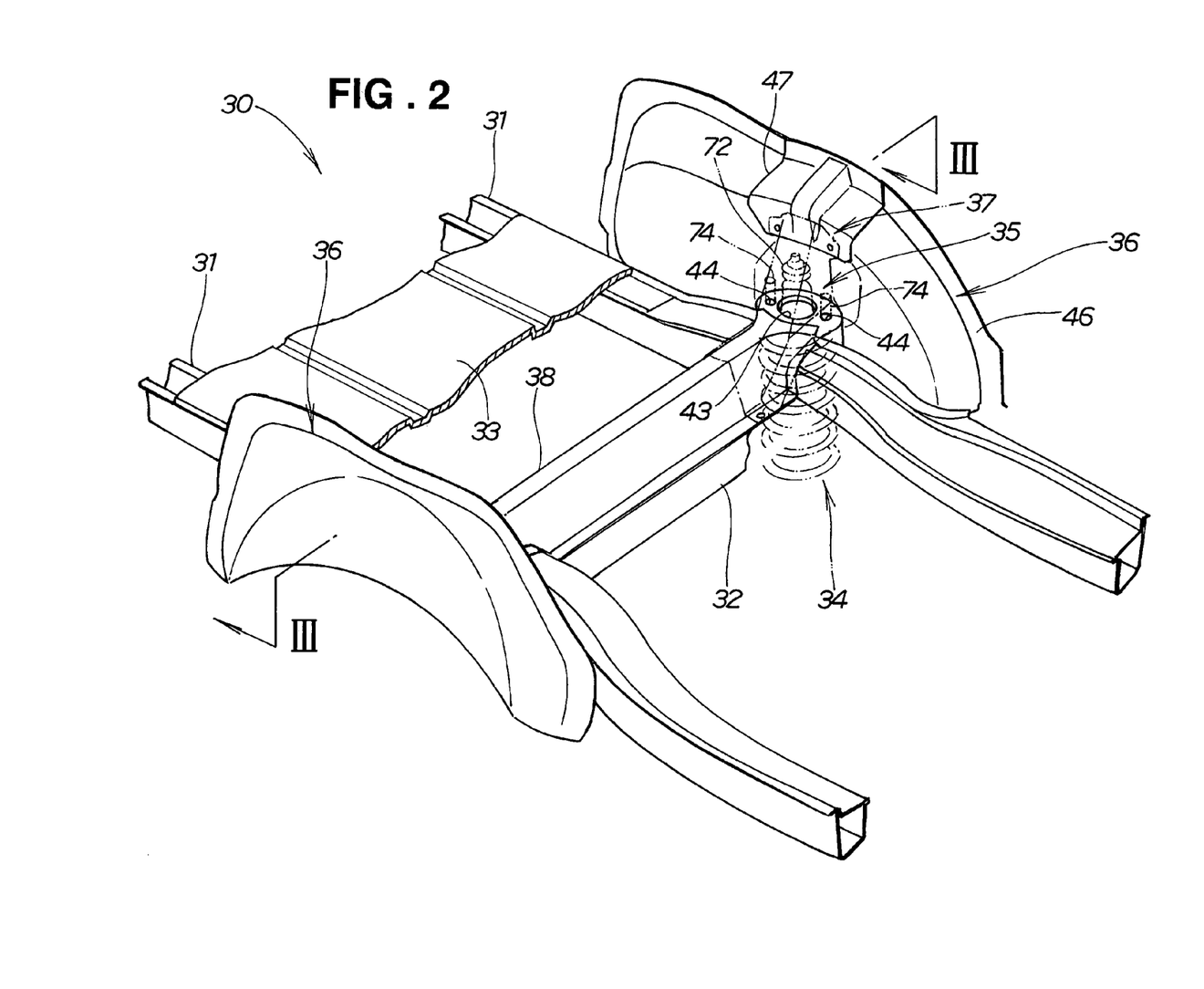
FIG. 2 is a perspective view, with parts cut-away for clarity, of the vehicle rear body structure.

As shown in FIG. 2, the rear body structure 30 generally comprises left and right floor frames 31, 31 extending in a longitudinal (front-to-rear) direction of the vehicle 10 (FIG. 1), an under frame 32 connected to and extending crosswise between the left and right floor frames 31, 31, a body floor 33 mounted to the floor frames 31, 31 and the under frame 32, left and right damper support members 35, 35 (right one being shown in FIG. 2) mounted to the body floor 33 adjacent to the respective floor frames 31, 31 for supporting upper end portions of left and right dampers 34 (right one being shown in FIG. 2), respectively, left and right wheel houses 36, 36 disposed outwardly of the left and right damper support members 35, 35, respectively, in a transversal (widthwise) direction of the vehicle and mounted to the body floor 33 and the corresponding floor frames 31, 31 for covering upper parts of left and right rear wheels 13, 13(FIGS. 1 and 2), left and right gussets 37, 37 (right one being shown in FIG. 2) for reinforcing the body floor 33, the wheel houses 36, 36 and the damper support members 35, 35, and a cross-member 38 connected to and extending crosswise between the floor frames 31, 31.

The damper support members 35 have a generally cup-shaped configuration open downward and each have a central through-hole 72 and a pair of bolt-insertion holes 44, 44 that are formed in a closed upper end of the cup-shaped damper support member 35 for insertion therethrough of a cylindrical protrusion 72 and a pair of bolts 74, 74 of the upper end portion of a respective one of the dampers 34. The bolt-insertion holes 44 are disposed in diametrically opposite relation to each other.

Figure 3:
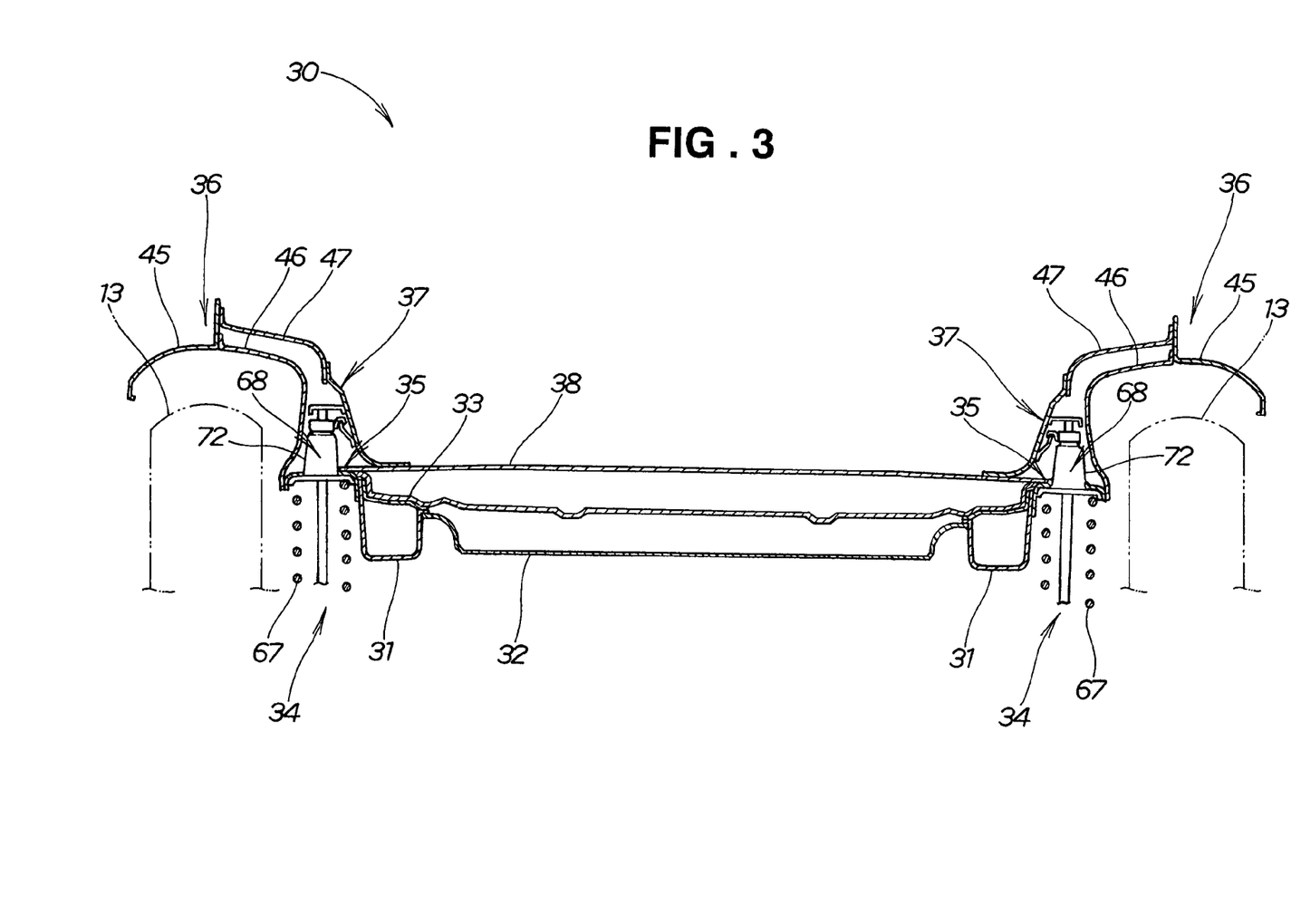
FIG. 3 is a cross-sectional view taken along line III—III of FIG. 2.

As shown in FIG. 3, the wheel houses 36 are disposed on opposite sides of the body floor 33 in the transversal direction of the vehicle, and the damper support members 35 are disposed inward of the wheel houses 36. Each of the wheel houses 36 is composed of an outer member 45 and an inner member 46 joined together for covering outer and inner portions, respectively, of the upper part of a respective one of the rear wheels 13 and includes a reinforcing plate 47 extending over and along an upper part of the inner member 46. Each of the damper support members 35 is connected to the inner member 46 of a respective one of the wheel houses 36, and a respective one of the floor frames 31, one side of the body floor 33, and one end of the cross-member. Since the left and right damper support members 35, 35 are connected together by the cross-member 38, the rigidity of the damper support members 35 in the transversal direction of the vehicle body increases greatly.

Each of the gussets 37 is connected to the reinforcing plate 47 of a respective one of the wheel houses 36 and one end of the cross-member 38. Though not shown in FIG. 3, the gusset 37 is also connected to the upper end portion of a respective one of the dampers 34, a respective one of the damper support members 35, and one side of the body floor 33. The thus connected gussets 37, on one hand, reinforce the respective damper support members 35 and neighboring parts (i.e., the body floor 33 and the wheel houses 36) of the damper support members 35 and, on the other hand, are reinforced by the cross-member 38. The cross-member 38 is connected at opposite ends to the body floor 33. By thus providing the cross-member 38, the rigidity of the rear body structure 30 in the transversal direction of the vehicle body is considerably increased.

Figure 4:
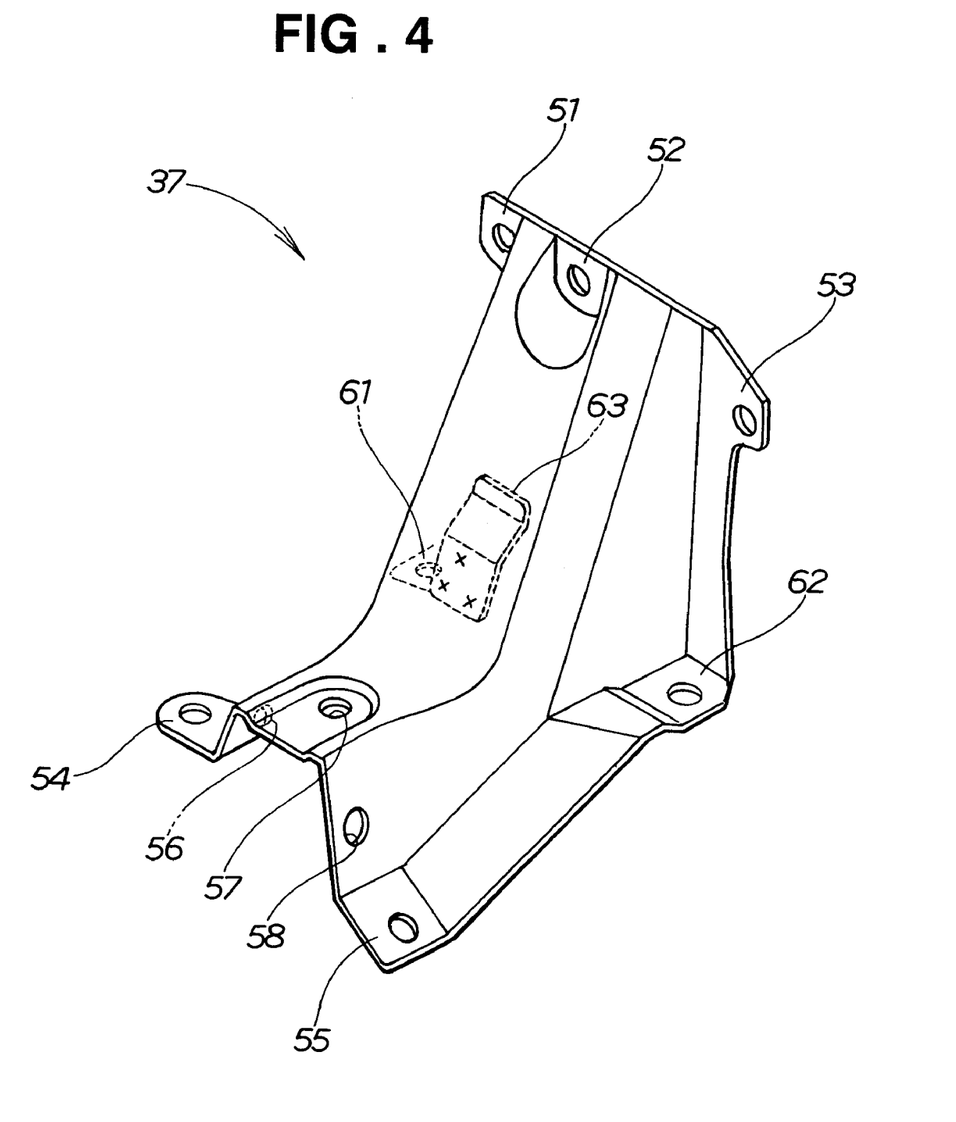
FIG. 4 is a perspective view of a gusset which forms part of the vehicle rear body structure of the present invention.
Figure 9:
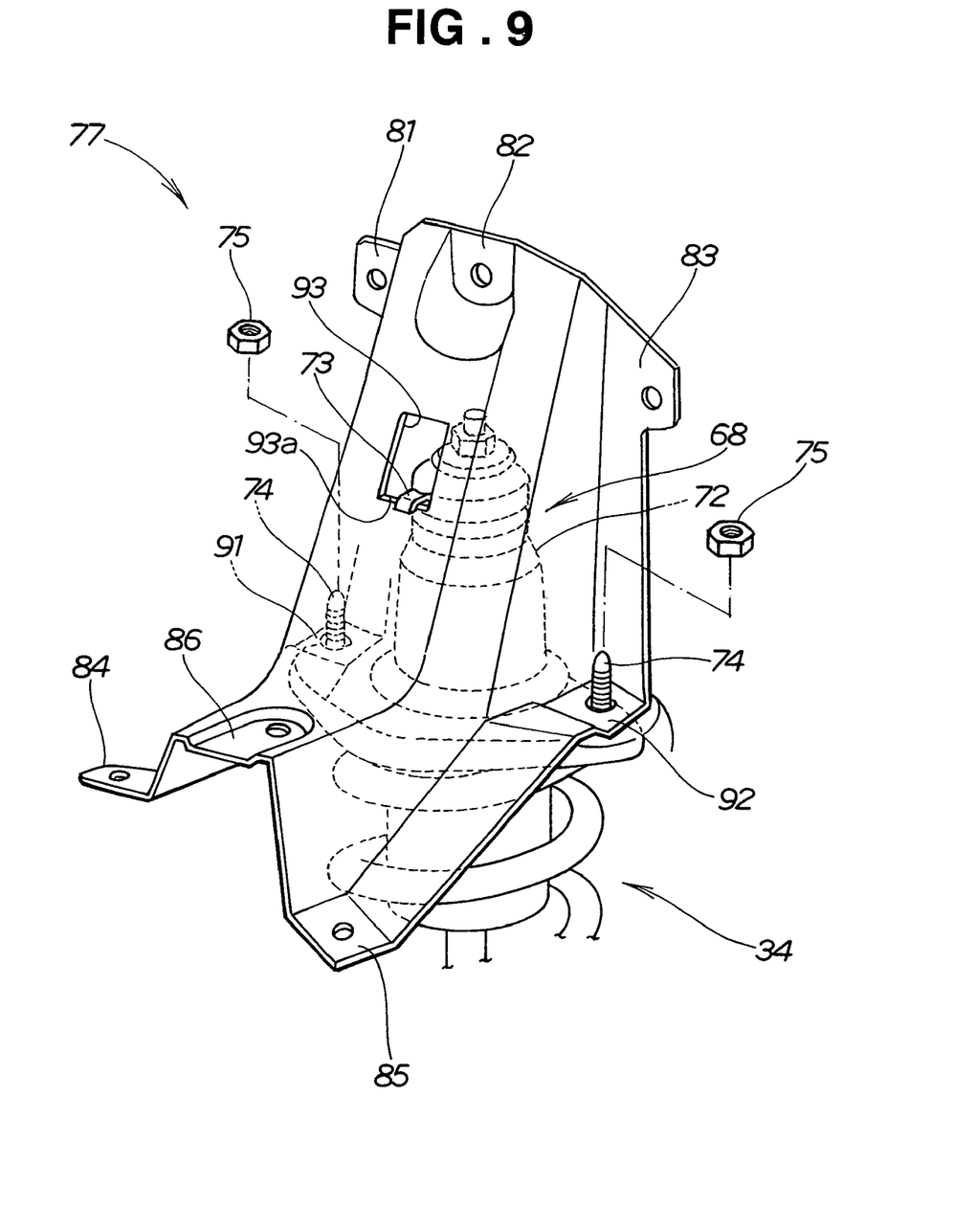
FIG. 9 is a perspective view similar to FIG. 5, but showing a modification according to the present invention.

As shown in FIG. 4, the gusset 37 is press-formed from a steel plate into a generally L-shaped configuration and has a generally U-shaped cross section with flanges at open end thereof. The gusset 37 has an upper end portion (first portion) 51, 52, 53 connected to the wheel house 36 (FIG. 3), a lower end portion (second portion) 54, 55, 56, 57, 58 connected to the body floor 33 (FIG. 6) and the cross-member 38 (FIG. 3), and an intermediate portion (third portion) 61, 62 connected to the damper support member 35 and the upper end portion of the damper 34 (FIG. 9). A part of the second portion designated by numerals 54 and 55 is used to connect the gusset 37 to the body floor 33, and another part of the second portion designated by numerals 56, 57 and 58 is used to connect the gusset 37 to the cross-member 38. The gusset 37 also has a retaining portion in the form of a lug 63 projecting upward from an inner surface of the gusset 37 for temporarily supporting the upper end portion of the damper 34 in a pre-assembled condition during assembly of the damper 34 relative to the vehicle body, as will be described later.

Figure 5:
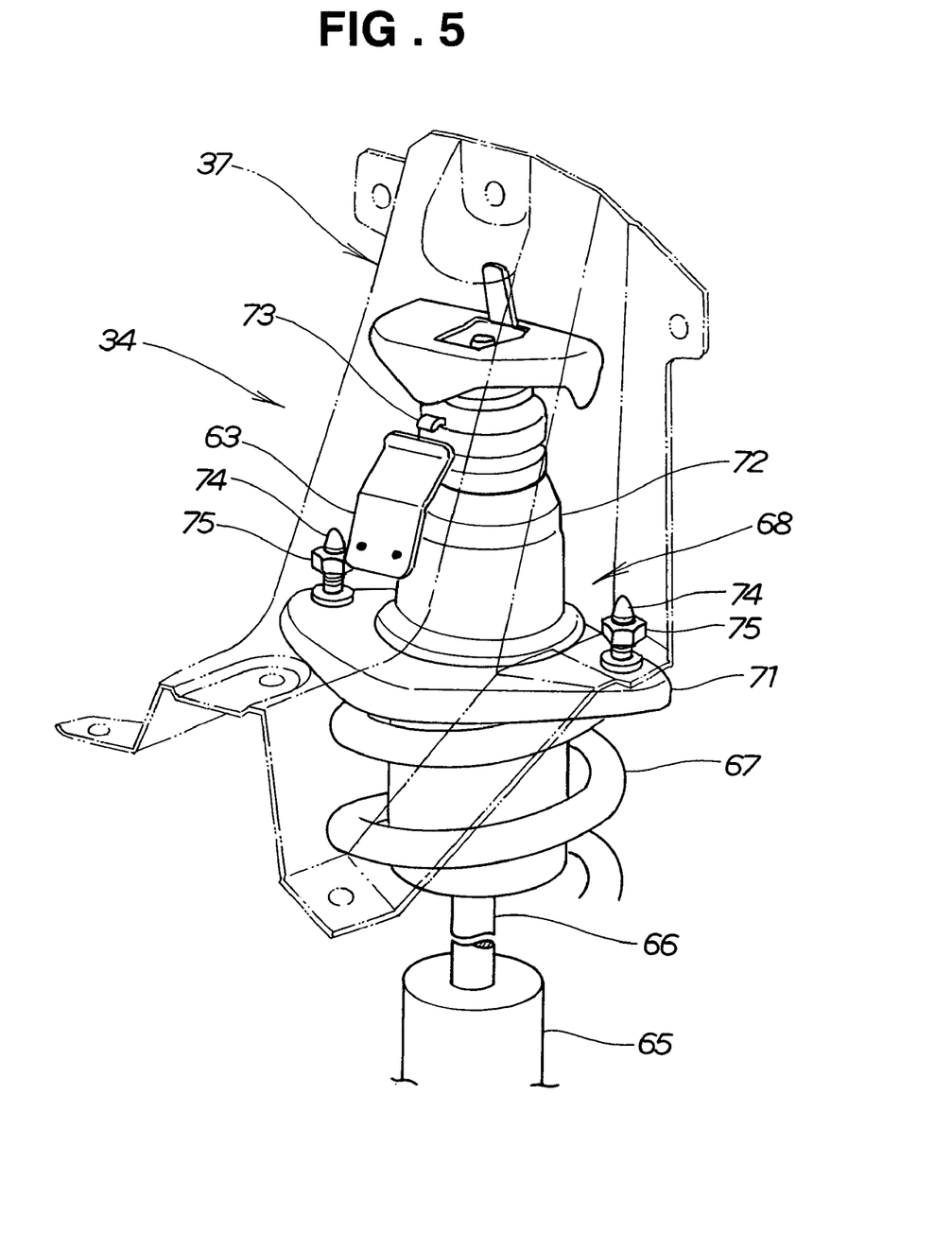
FIG. 5 is a perspective view showing the relation between the gusset and a damper of the invention.

FIG. 5 shows the relationship between the gusset 37 and the damper 34. The damper (shock absorber) 34 comprises a cylinder 65 containing hydraulic fluid, a rod 66 connected at its inner end (lower end in FIG. 5) to a piston slidably received in the cylinder 65 and projecting from the cylinder 65, an upper mounting bracket 68 connected to an outer end (upper end in FIG. 5) of the rod 66, and a coil spring 67 disposed between the upper mounting bracket 68 and a lower mounting bracket (not shown). The upper mounting bracket 68 forms the afore-said upper end portion of the damper 34.

The upper mounting bracket (upper end portion) 68 of the damper 34 includes a mounting flange 71, a cylindrical protrusion 72 projecting upward from a central portion of the mounting flange 71, a hook-shaped engagement portion 73 formed on a sidewall of the cylindrical protrusion 72 for interlocking engagement with the retaining lug 63 of the gusset 37, and a pair of bolts 74, 74 disposed on the mounting flange 71 in diametrically opposite relation to each other with the cylindrical protrusion 72 disposed centrally between the bolts 74, 74. The cylindrical protrusion 72 is inserted through the through-hole 43 (FIG. 2) of the damper support member 35, and bolts 74 are inserted though the bolt-insertion holes 44 (FIG. 2) of the damper support member 35. The bolts 74 also extend through the third or intermediate portion 61, 62 (FIG. 4) of the gusset 37. Nuts 75, 75 are screwed onto the respective bolts 74, 74 to firmly connect together the intermediate portion 61, 62 of the gusset 37, the damper support member 35 and the upper mounting bracket 68 of the damper 34 with the damper support member 35 disposed between the gusset intermediate portion 61, 62 and the flange 71 of the upper mounting bracket 68.

Figure 6:
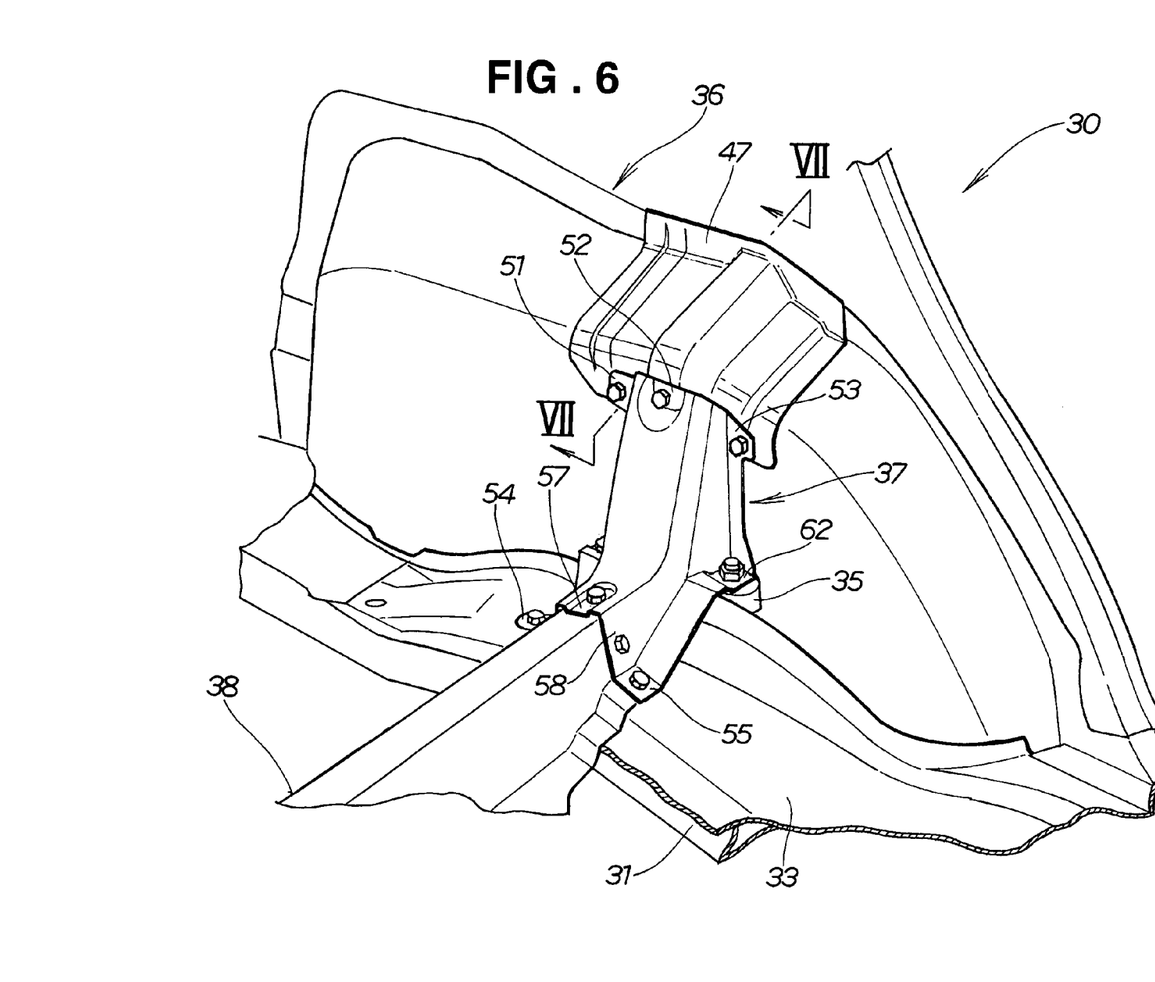
FIG. 6 is a perspective view showing, on enlarged scale, a left side of the vehicle rear body structure.

As shown in FIG. 6, the gusset 37 is connected at the first or upper end portion 51–53 thereof to the reinforcing plate 47 of the wheel house 36, at the second or lower end portion 54–58 thereof, to the body floor 33 and the cross-member 38 and, at the third or intermediate portion thereof, to the damper support member 35 and the upper end portion (upper mounting bracket 68 shown in FIG. 5) of the damper 34. By thus connecting the gusset 37, a force applied from the damper 34 to the damper support member 35 can be efficiently distributed through the gusset 37 to the wheel house 36 and the body floor 33. As a result, the rigidity of a damper portion including the damper support member 35 and neighboring part (i.e., the wheel house 36 and the body floor 33) thereof is greatly improved.

Figure 7:
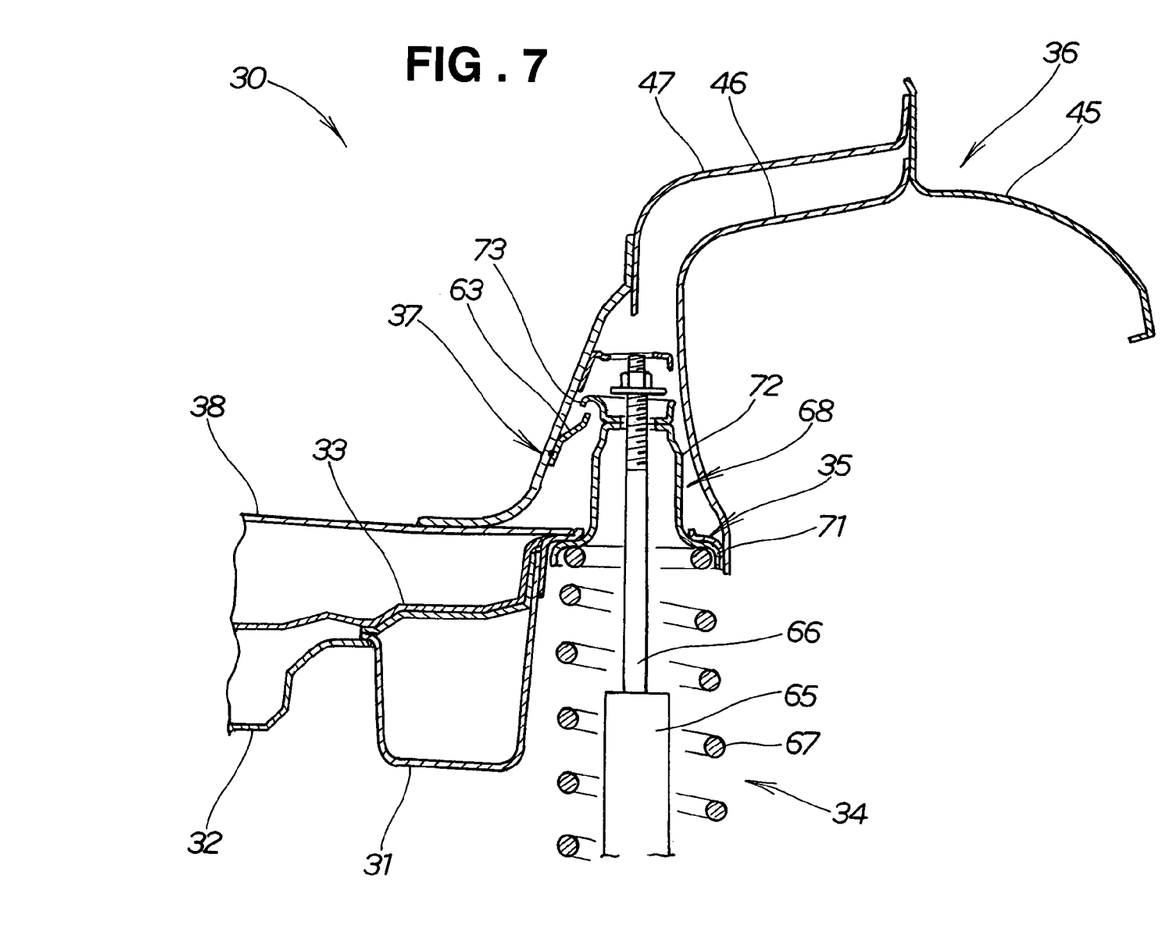
FIG. 7 is cross-sectional view taken along line VII—VII of FIG. 6.

FIG. 7 is a cross-sectional view taken along line VII—VII of FIG. 6. As shown in this figure, the hook-shaped engagement portion 73 provided on the cylindrical protrusion 72 of the upper mounting flange 68 of the damper 34 is directed downward, while the retaining lug 63 projecting from the inner surface of the gusset 37 is directed upward. The hook-shaped engagement portion 73 and the retaining lug 63 cooperate with each other to keep the upper mounting bracket 68 in a preassembled condition relative to the damper support member 35, thereby facilitating the assembly of the damper 34 to the vehicle body.

Figure 8A:
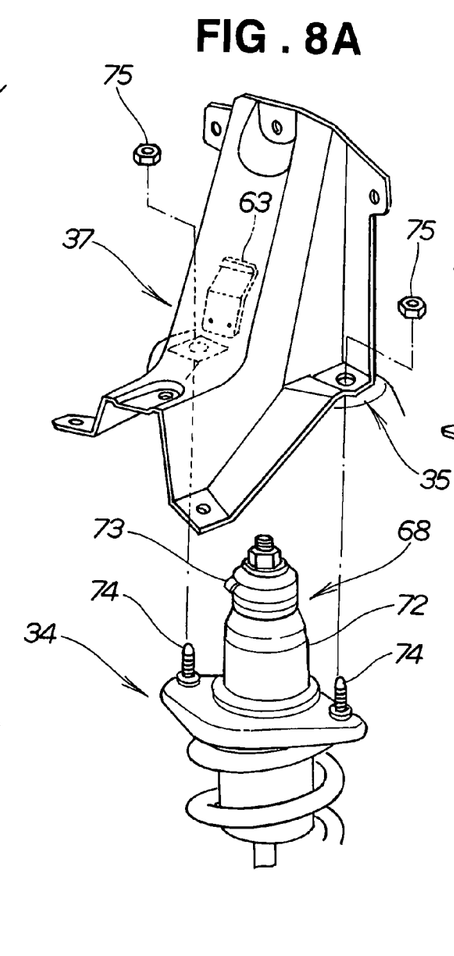
FIGS. 8 to 8C are perspective views illustrative of an assembly sequence of the damper relative to the vehicle body.
Figure 8B:
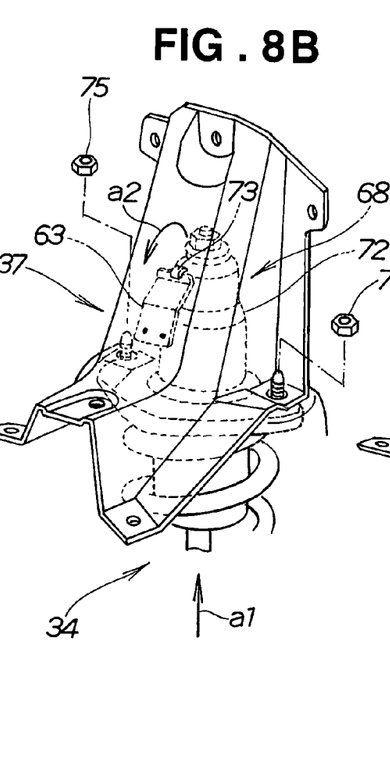

FIGS. 8A to 8C show an assembly sequence of the damper 34 relative to the vehicle body. As shown in FIG. 8A, the damper 34 is positioned directly below the damper support member 35 with the upper mounting bracket 68 directed upward. Then, the upper mounting bracket 68 is moved upward into the downwardly open cup-shaped damper support member 35 from below, as indicated by the arrow "a1" shown in FIG. 8B, so that the cylindrical protrusion 72 and the bolts 74 are inserted upward through the through-hole 43 (FIG. 2) and the bolt-insertion holes 44 (FIG. 2) of the damper support member 35, respectively.

Then, the upper mounting bracket 68 is moved in a lateral inward direction, as indicated by the arrow "a2" shown in FIG. 8B, so that the hook-shaped engagement portion 73 hooks itself on the retaining lug 63 of the gusset 37. With this hooking engagement between the hook-shaped engagement portion 73 and the retaining lug 63, the upper mounting bracket 68 is kept in a preassembled position of FIG. 8B relative to the damper support member 35. The operator is now allowed to release the damper 34.

Figure 8C:
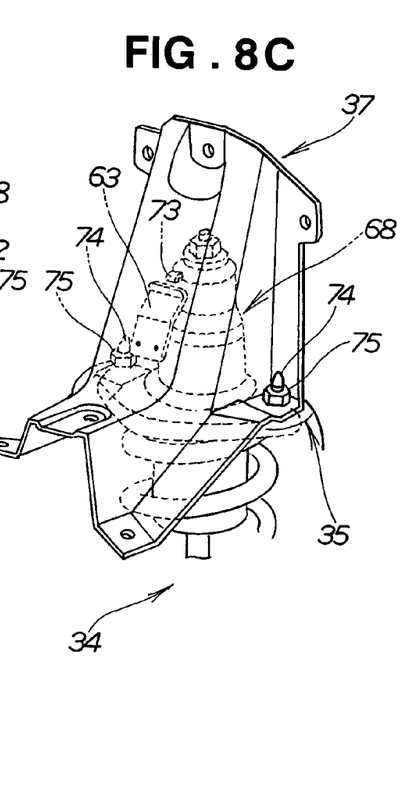

Subsequently, the nuts 75 are screwed onto the respective bolts 74 to firmly connect together the intermediate portion of the gusset 37, the damper support member 35 and the upper mounting bracket 68 of the damper 34 with the damper support member 35 disposed between the intermediate gusset portion and the upper mounting bracket 68, as shown in FIG. 8C. The upper mounting bracket 68 is now in a finally assembled position relative to the damper support member 35, where the hook-shaped engagement portion 73 of the upper mounting bracket 68 is disengaged from the retaining lug 63 because the upper mounting bracket 68 including the hook-shaped engagement portion 73 moves upward as the nuts 75 are tightened. During tightening of the nuts 75, the operator is not required to support the damper 34 from below. This increases the assembling efficiency of the vehicle body.

FIG. 9 shows a modified form of the gusset according to the present invention. The modified gusset 74 differs from the gusset 37 shown in FIG. 4 in that a rectangular opening 93 is formed in a top wall of the gusset 37 in place of the retaining lug 63 on the gusset 37. A lower horizontal edge 93a defining part of the rectangular opening 93 serves as a retaining portion which is releasably engageable with the hook-shaped engagement portion 73 of the upper mounting bracket 68 of the damper 34 to temporarily keep or retain the upper mounting bracket 68 in the preassembled condition relative to the damper support member 35 in the same manner as described above. The modified gusset 77 does not require a separate member for forming a retaining member such as retaining lug 63 on the gusset 37 and hence can be manufactured at a relatively low cost as compared to the gusset 37.

Likewise the gusset 37 shown in FIG. 4, the modified gusset 77 shown in FIG. 9 has an upper end portion (first portion) 81, 82, 83 for connection to the wheel house 36 (see FIG. 6), a lower end portion (second portion) 84, 85, 86 for connection to the body floor 33 and the cross-member 38 (see FIG. 6), and an intermediate portion (third portion) 91, 92 for connection to the damper support member 35 (see FIG. 6) and the upper mounting bracket 68 of the damper 34.

Obviously, various minor changes and modifications of the present invention are possible in the light of the above teaching. It is therefore to be understood that within the scope of the appended claims the invention may be practiced otherwise than as specifically described.

What is claimed is:

1. A rear body structure for a vehicle, comprising:
    left and right floor frames extending longitudinally of the vehicle;
    a body floor mounted to the left and right floor frames;
    left and right wheel houses mounted to the body floor for covering respective upper parts of left and right rear wheels of the vehicle;
    left and right damper support members disposed adjacent to the left and right wheel houses, respectively;
    left and right dampers each having an upper end portion supported by a respective one of the damper support members; and
    left and right gussets for reinforcing the body floor, the wheel houses and the damper support members, the gussets each having a first portion connected to a respective one of the wheel houses, a second portion connected to the body floor, and a third portion connected to a respective one of the damper support members and a mounting flange on the upper end portion of a respective one of the dampers with the damper support member disposed between the third portion and the mounting flange.

2. The rear body structure according to claim 1, wherein said mounting flanges are disposed below a respective one of the damper support members, a plurality of bolts projecting upward from each mounting flange, the bolts extending successively through the damper support member and the third portion of the gusset, and nuts screwed onto the respective bolts to firmly secure the third portion of the gusset and the mounting flange of the upper portion to the damper support member.

3. The rear body structure according to claim 1, further comprising a cross-member connected to and extending crosswise between the left and right floor frames, the cross-member also connecting the left and right damper support members.

4. The rear body structure according to claim 3, wherein the second portion of each of the gussets is also connected to the cross-member.

5. The rear body structure according to claim 3, wherein the cross-member is also connected to the body floor.

6. The rear body structure according to claim 4, wherein the cross-member is also connected to the body floor.

7. The rear body structure according to claim 1, wherein each of the wheel houses is composed of an outer member and an inner member joined together for covering outer and inner portions, respectively, of the upper part of a respective one of the rear wheels and includes a reinforcing plate extending over and along an upper part of the inner member, and wherein the first portion of each of the gusset is connected to the reinforcing plate.

8. The rear body structure according to claim 1, wherein the upper end portion of each damper has a hook-shaped engagement portion, and the gussets each have a retaining portion releasably engageable with the hook-shaped engagement portion for temporarily retaining the upper end portion of each damper in a preassembled condition relative to a respective one of the damper support members.

9. The rear body structure according to claim 8, wherein the retaining portion comprises a retaining lug projecting upward from an inner surface of each of the gussets.

10. The rear body structure according to claim 8, wherein each of the gussets have an opening formed therein, the retaining portion comprising an edge defining part of the opening of each gusset.

* * * * *